April 23, 1968 M. CSABI 3,379,625

SEMICONDUCTOR TESTING

Filed March 30, 1964 2 Sheets-Sheet 1

INVENTOR:
MENYHERT CSABI,

BY Robert J. Mooney
HIS ATTORNEY.

INVENTOR:
MENYHERT CSABI,
BY Robert J. Mooney
HIS ATTORNEY.

United States Patent Office 3,379,625

Patented Apr. 23, 1968

3,379,625

SEMICONDUCTOR TESTING

Menyhert Csabi, North Syracuse, N.Y., assignor to General Electric Company, a corporation of New York Filed Mar. 30, 1964, Ser. No. 355,688
9 Claims. (Cl. 204—1)

ABSTRACT OF THE DISCLOSURE

A method of testing and revealing reverse bias breakdown of particular PN junctions in a wafer of semiconductor material having a plurality of pellets each containing at least one such junction. The wafer is immersed in an electrolytic solution so that a test surface on the wafer on one side of each said junction is exposed to the solution and a test potential is connected between the solution and another point on the wafer on the opposite side of each such junction so as to reverse bias each such junction. Failure of any such junction by reverse breakdown at the test potential initiates electrolytic action which transfers material between the solution and a portion of the wafer containing such failed junction, hereby altering the appearance of such test surface and revealing the failure.

The present invention relates to improvements in the manufacture of broad area PN junction semiconductor devices, and more particularly to improved methods of testing reverse-bias DC breakdown voltage of broad area PN junctions in bodies of semiconductor material.

In the manufacture of transistors or similar devices having broad area PN junctions in bodies of semiconductor material, one method heretofore used to test and evaluate the reverse-bias breakdown voltage of a PN junction formed in a body or pellet of semiconductor material involved contacting probes to respective regions of the pellet on opposite sides of the junction, applying a suitable potential across the junction by means of such probes, and measuring or detecting the amount of current flow through the junction in a reverse-bias direction. Such a test and evaluation method has the disadvantage that each pellet must be individually probed, so that an excessive amount of labor and time is required to test pellets in appreciable volume.

A principal object of the present invention is to provide an improved method for testing and evaluating broad area PN junction semiconductor devices for reverse-bias DC breakdown voltage, wherein a large number of semiconductor bodies or pellets containing respective individual junctions, such as a wafer or wafers of semiconductor material in which have been formed several hundred individual junctions, can be tested automatically, quickly, and without handling or testing of individual pellets.

Referring to the drawing.

Figure 1:
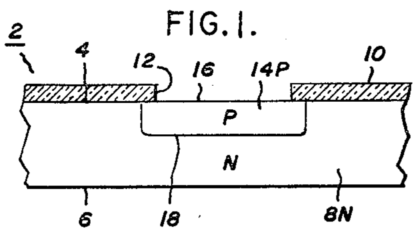
FIGURE 1 is an enlarged fragmentary sectional view of an individual semiconductor pellet of a type to which the test and evaluation process of the present invention is particularly applicable.

The semiconductor pellet in FIGURE 1 includes a body 2 of semiconductor material such as monocrystalline silicon having a pair of opposed major faces 4, 6. An N-type conductivity region 8N extends throughout major face 6 and the other major face 4 is covered by a mask 10 of electrically insulative material such as silicon dioxide having an aperture 12 through which is exposed a P-type conductivity region 14P separated from the N-type conductivity region 8N by a PN junction 18. The surface 16 of the structure of FIGURE 1 exposed through aperture 12 constitutes a test surface in accordance with my invention, as will hereinafter by explained more fully.

Figure 2:
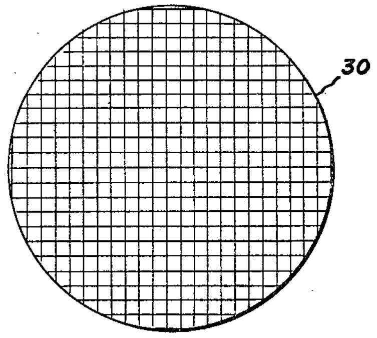
FIGURE 2 shows a semiconductor wafer comprising several hundred pellets of the type shown in FIGURE 1, before the wafer is subdivided into such individual pellets.

FIGURE 2 shows a wafer 30 of semiconductor material comprising, and capable of being subdivided into, several hundred individual pellets such as pellet 2 of FIGURE 1.

According to one aspect of my invention, the reverse-bias DC breakdown voltage of the junction, such as junction 18, of each of the large number of pellets in a wafer, such as wafer 30, are immersed in a bath of liquid conneously before the wafer is broken up into its individual pellets.

In the practice of my invention, one or more wafers, such as wafer 30, are immersed in a bath of liquid containing electrically charged particles capable of movement responsive to an electric field. The bath may be an electrolyte, in which case the charged particles may be ions derived from the atoms of the constituents of the electrolyte, or the bath may be electrophoretic, in which case the charged particles may be colloidal or suspensoidal particles suspended in the liquid of the bath. The present invention contemplates utilization of such charged particles whether they be ionic or suspensoidal in nature, and hence for the purpose of this specification, the term "electromotive particles" is used as a generic term to define both ionic and suspensoidal charged particles. the term "electromotive solution" is also used to refine a liquid medium containing electromotive particles capable of movement in response to an applied electric field.

Figure 3:
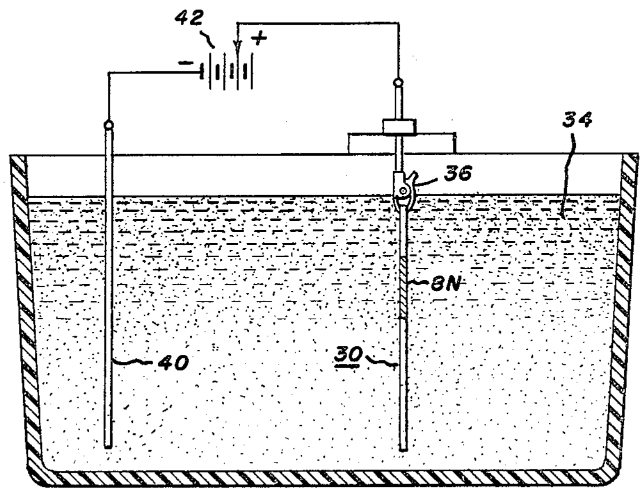
FIGURE 3 is a schematic representation of one form of test apparatus for carrying out my invention.

In general, electromotive solutions of the electrolytic type useful in accordance with the present invention may consist of a solution of any material capable of providing mobile cations and anions, and which does not attack semiconductor material of pellet 2, or mask 10, or the associated contacts. For example, dilute water solutions of various acids, such as phosphoric or sulphuric acid, may be employed with semiconductor pellets having aluminum contacts. One electromotive solution of the electrolytic type useful in accordance with the present invention when the test surface 16 of pellet 2 is silicon, or consists of an aluminum contact on the silicon, is a dilute water solution of sulphuric acid having a concentration of 10 parts concentrated sulphuric acid to 1000 parts of deionized water. Referring to FIGURE 3, a conductive member 40 which may serve as a cathode, such as a rod or sheet of lead, aluminum, gold, or other material non-reactive with the electrolyte, is placed in contact with such an electrolytic electromotive solution 34 and one or more semiconductor wafers 30 are immersed in the solution to serve as an anode. The common N-type conductivity region 8N of all of the pellets of the wafer 30 is electrically connected by any suitable means, such as a conductive clamp 36, to the opposite polarity, or positive, terminal of a source of adjustable magnitude DC voltage 42. The negative terminal of voltage source 42 is connected to the cathode 40. Voltage source 42 should have a maximum magnitude in excess of reverse-bias breakdown voltages being tested, and may be, for example, 100 volts.

With this arrangement, application of the electromotive potential provided by voltage source 42 with the polarity indicated makes the N-type conductivity region 8N of each pellet positive with respect to the P-type conductivity region which is biased negative by its contact with electromotive solution 34. Thus, the junction 18 of each pellet is reverse biased, and if the electromotive potentional provided by voltage source 42 is less than the reverse-bias DC breakdown potential BV of each junction 18, no current (except for leakage current, which is insignificant) flows through the junction 18. If, however, the electromotive potential of source 42 is set at a value exceeding the reverse-bias DC breakdown voltage of any junction 18, that junction does break down, permitting current to flow through it to the exposed test surface 16 of the pellet whose junction has broken down, and thereby complete a current flow path through solution 34 from the positive to the negative terminal of voltage source 42. When such current flows, the negative oxygen anions in the solution 34 move toward the individual anode presented by the test surface 16 of the pellet whose junction 18 has broken down, and upon arrival at such test surface 16, releases electrons there present to form nascent oxygen. The nascent oxygen evolves on the test surface 16 of each pellet whose junction 18 has broken down and thereon forms a layer of oxide of the test surface material, i.e. silicon or any contact metal previously applied thereto.

Thereafter, when the wafer 30 is removed from the electrolytic electromotive solution 34 and cleaned, for example by rinsing in deionized water and dried, the localized oxidation or anodization on surfaces 16 of each pellet whose reverse-bias DC breakdown voltage had been exceeded, produces a visually detectable discoloration or change in appearance of the test surface 16 of each such pellet. Thus after the wafer is broken up into its individual pellets, those pellets indicated to be defective by virtue of such discoloration or change of appearance may be readily sorted out and separated from the remainder.

Any extraneous oxidation produced by electrolytic action at the major surface 6 of each pellet occurs at a much slower rate than at test surface 16 because the surface 6 is much larger in area, and affects all the pellets substantially uniformly, and therefore does not objectionably interfere with the test process of my invention. Also, the major surface 6 may, if desired, be provided with a temporary coating of wax or the like, insulating it from the electromotive solution.

If use of an electromotive solution of the electrolytic type is impractical or undesirable, as for example where the test surfaces 16 may already be covered with a contact metal layer of gold or other material not susceptible to change in appearance by oxidation, an electromotive solution of the electrophoretic type may be employed. With silicon pellets such a solution may consist, for example, of particles of iron oxide suspended in methanol. In methanol, the iron oxide particles have a positive polarity, and are attracted to the test surface 16 of any pellet which becomes negative by reason of junction breakdown, thereby forming on each such test surface a coating of iron oxide which is not only visible, but has the added advantage of being ferromagnetic and thereby permitting separation of defective pellets by magnetic sorting. For pellets whose test surfaces become positive at junction breakdown, iron oxide particles in acetone and having a negative polarity may be used.

Figure 4:
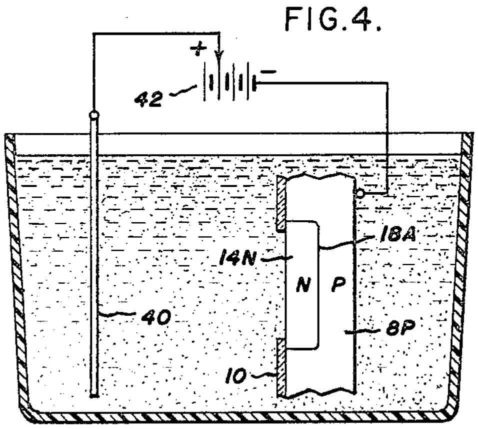
FIGURE 4 is a view showing test apparatus similar to FIGURE 3, and showing in enlarged fragmentary sectional form, similar to FIGURE 1, another type of pellet to which my invention is applicable.

Pellets of the type shown in FIGURE 4 are the reverse of that in FIGURE 1 in that the test surface provided by that portion of region 14N exposed through the opening in the mask 10 is an N-type region and the region 8P exposed at the major face 6 is a P-type region separated from region 14N by a PN junction 18A. However, such pellets can be tested according to the present invention by a test method similar to that above described except that the electrode 40 contacting the electromotive solution 34 becomes the anode, and the common P-type conductivity region of all the pellets of the wafer is connected to the opposite polarity, i.e. negative, pole of voltage source 42 so as to reverse bias the PN junction 18A. In this instance, it is convenient to use an electrolytic electromotive solution containing positive ions or cations of a type which will plate out on the test surface after junction breakdown occurs. Such an electrolyte is, for example, a dilute, e.g. 1% concentration by weight, deionized water solution of a metal salt such as copper sulfate, gold chloride, silver nitrate, or the like. When the electromotive potential of DC voltage source 42 exceeds the reverse-bias DC breakdown potential of the junction 18A, junction breakdown occurs. The positively charged cations in the electrolyte then flow toward the test surface 16 of each pellet whose junction has broken down, and there take on electrons to form atoms which deposit on the test surface 16 of each defective pellet as a visible or otherwise easily detectable plating.

Figure 5:
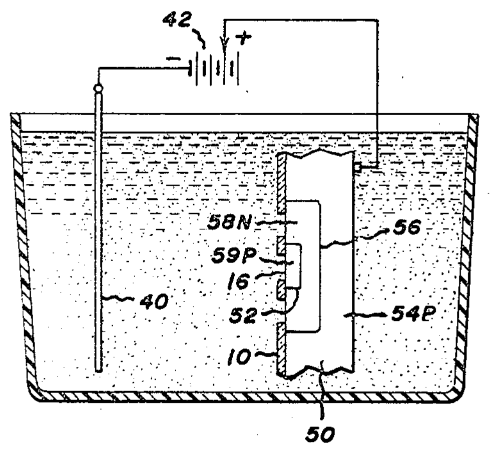
FIGURES 5, 6, 7 and 8 are views similar to FIGURE 4 showing enlarged fragmentary sectional views of still other forms of pellets arranged for testing according to my invention.

Each junction of a multiple junction device having any number of junctions may also be tested in accordance with my invention. For example, electrolytic action may be employed to test the collector-to-base or emitter-to-base junction 52 of two-junction PNP pellets 50 as shown in FIGURE 5. To test the emitter-to-base junction, the P-type collector region 54P of each such pellet is connected as the anode to the positive terminal of the voltage source 42, and thus the collector-to-base junction 56 is forward biased. The emitter-to-base junction 52, however, is reverse-biased, and so long as the emitter-to-base junction does not break down, no reverse current (except for leakage current, which is insignificant) flows between the emitter region 59P and the electrolyte. Upon breakdown of the emitter-to-base junction 52 under reverse bias, oxygen atoms are evolved at the test surface 16 of the emitter region 59P, and forms an oxide coating on the test surface, which facilitates visual detection of defective pellets. In the event that it is impossible or impractical to oxidize the test surface 16 of emitter 59P, an electrophoretic electromotive solution may be employed for depositing negatively charged particles of, for example, iron oxide suspended in acetone, on test surface 16 of any defective pellets 50.

Figure 6:
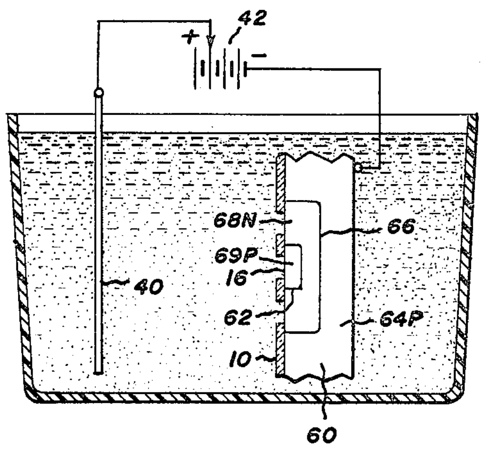

FIGURE 6 illustrates the testing of the collector-to-base junction 66 of a PNP pellet 60. The P-type collector region 64P is connected as the cathode to the negative terminal of the voltage source 42 and the electrode 40 is connected as the anode to the positive terminal of voltage source 42. The emitter-to-base junction 62 is thus forward biased and the collector-to-base junction 66 is reverse biased. As with the arrangement of FIGURE 4, an electromotive solution of electrolytic type is used containing positive cations which upon reverse-bias breakdown of the collector-to-base junction 66 will plate out on the test surface 16 of emitter 69P, as well as the exposed surface of base 68N, and thereby enable identification of defective pellets.

Figure 7:
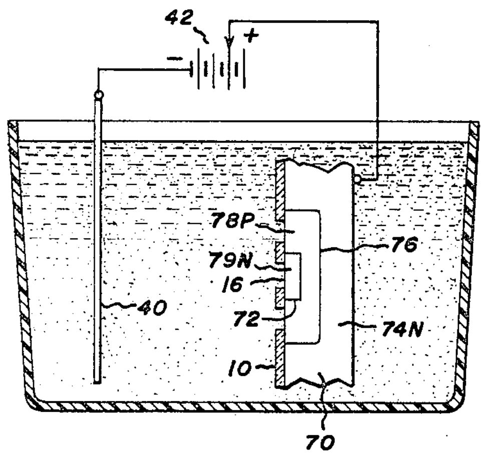

FIGURE 7 illustrates the testing of the collector-to-base junction 76 of an NPN pellet 70. The N-type collector region 74N is connected as the anode to the positive terminal of the voltage source 42 and the electrode 40 is connected as the cathode to the negative terminal of voltage source 42. The emitter-to-base junction 72 is thus forward biased and the collector-to-base junction 76 is reverse biased. As with the arrangement of FIGURE 1, an electrolyte is used containing negative oxygen anions which upon reverse-bias breakdown of the collector-to-base junction 76 will form oxygen on the test surface 16 of emitter 79N and the surface of base 78P and thereby enable identification of defective pellets. If for any reason it is impossible or impractical to oxidize the test surface 16 of emitter 79N, an electrophoretic electromotive solution may be employed containing suspensoidal particles which are negatively charged and upon reverse-bias breakdown of the collector-to-base junction 76 will form a visible or otherwise detectable deposit on the test surface 16 of emitter 79N and the exposed surface of base 78P.

Figure 8:
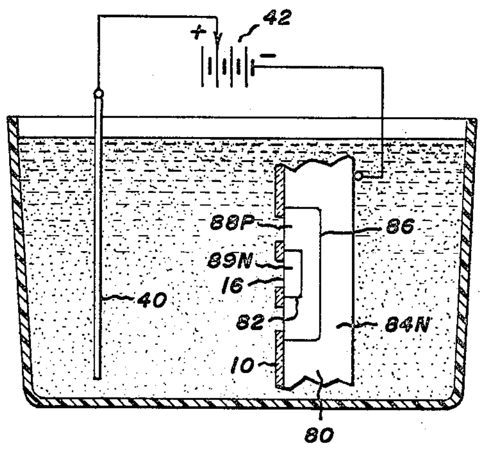

FIGURE 8 illustrates the testing of the emitter-to-base junction 82 of an NPN pellet 80. The N-type collector region 84N is connected as the cathode to the negative terminal of the voltage source 42 and the electrode 40 is connected as the anode to the positive terminal of voltage source 42. The collector-to-base junction 86 is thus forward biased and the emitter-to-base junction 82 is reverse biased. As with the arrangement of FIGURE 4, an electrolyte is used containing positive metal cations which upon reverse-bias breakdown of the emitter-to-base junction 82 will plate out on the test surface 16 of emitter 89N and thereby enable identification of defective pellets.

The foregoing examples have involved deposition of matter from the electromotive solution onto the test surfaces of pellets whose junctions under test fail the reverse-bias breakdown test. In some cases the deposited matter described was oxygen where negative oxygen ions were neutralized, in other cases the deposited matter was a metal plating resulting from neutralization of positive metal ions, and in still other cases deposition of particles from electrophoretic electromotive solutions was described. However, the present invention also contemplates the identification of pellets which fail the reverse-bias test by means of changes resulting from removal of matter from the defective pellet into the electromotive solution. That is, the principle of electrolytic etching may be employed, for example, wherein an electrolyte is used in which ions flowing to the test surface of a defective pellet evolve atoms which form a compound with the material of the test surface, which compound dissolves in the electrolyte, thereby effectively etching or removing matter from the defective pellets. For example, with aluminum contacts on silicon, a dilute solution of sodium chloride or other halide salt will dissolve positively polarized contacts of defective pellets by anodic etching action. Thus, broadly speaking, the invention contemplates an identifying of defective junctions in terms of a transfer of matter between the pellet concerned and the electromotive solution, whether such transfer be in the form of addition of matter from the solution onto the test surface of the pellet or its contact, or in the form of a removal of material from such test surface into the solution.

It will be evident that the present invention provides a number of commercially important advantages. It enables testing of large numbers of pellets simultaneously, quickly, and with a minimum of labor. Test equipment involved is simple and inexpensive. Identification of defective pellets is positive and highly selective. And all the pellets in a wafer can be tested before the wafer is subdivided into its individual pellets.

It will be appreciated by those skilled in the art that the invention may be carried out in various ways and may take various forms and embodiments other than the illustrative embodiments heretofore described. Accordingly, it is to be understood that the scope of the invention is not limited by the details of the foregoing description, but will be defined in the following claims.

What I claim as new and desire to secure by Letters Patent of the United States is:

1. The method of testing and revealing reverse-bias breakdown of a PN junction of a semiconductor device including a body of semiconductor material having a test surface separated from another region of the body by said PN junction, said method comprising the steps of (1) immersing at least the test surface of said semiconductor device in an electromotive solution, and (2) subjecting said junction to a reverse bias by a source of test electromotive potential of selected magnitude less than said junction reverse breakdown and connected from an electrode contacting said solution to a region of said body on the opposite side of said junction from said test surface, whereby upon junction reverse breakdown at said selected magnitude of test potential the current flow through said electromotive solution changes the appearance of said test surface by transfer of material between said semiconductor device and said electromotive solution.

2. The method of claim 1 wherein said electromotive solution is electrolytic.

3. The method of claim 1 wherein said electromotive solution is electrophoretic.

4. The method of testing and revealing reverse-bias breakdown of a PN junction of a semiconductor device including a body of semiconductor material having a test surface separated from another region of the body by said PN junction, said method comprising the steps of, (a) immersing at least the test surface of said semiconductor in an electromotive solution, (b) connecting the poles of a source of electromotive potential respectively to an electrode contacting said electromotive solution and to a region of said body on the opposite side of said junction from said test surface, with the polarity of such connections being such as to reverse bias said junction, and (c) increasing the magnitude of said electromotive potential to a test value of reverse-bias breakdown voltage for said junction, whereby reverse-bias breakdown of said junction produces a detectable transfer of material between said electromotive solution and said test surface.

5. The method of claim 4 wherein said electromotive solution is electrolytic.

6. The method of claim 4 wherein said electromotive solution is electrophoretic.

7. The method of testing and revealing reverse-bias breakdown of particular PN junctions of a semiconductor device including a wafer of semiconductor material including a plurality of individual pellets each having an electrically insulative coating on one face provided with an opening through which is exposed a test surface separated from another face of the wafer by its own respective PN junction, said method of comprising the steps of, (a) immersing at least the test surface of each of said pellets of said semiconductor device in an electromotive solution, (b) connecting a region of said wafer on the opposite side of each of said junctions from said test surface to the pole of a source of electromotive potential having a polarity opposite to the conductivity type of said wafer at said opposite side of said junction, (c) connecting the other pole of said source of electromotive potential to an electrode contacting said electromotive solution, and (d) increasing the magnitude of said electromotive potential to a test value of reverse-bias breakdown voltage for said junction, whereby reverse-bias breakdown of any particular ones of said junctions produces a detectable transfer of material between said electromotive solution and the test surface of the pellet containing said junction.

8. The method of claim 7 wherein said electromotive solution is electrolytic.

9. The method of claim 7 wherein said electromotive solution is electrophoretic.

References Cited

UNITED STATES PATENTS

| | | | |
|---|---|---|---|
| 2,697,269 | 12/1954 | Fuller | 204—181 |
| 2,846,346 | 8/1958 | Bradley | 204—143 |
| 2,906,682 | 9/1959 | Fahnoe et al. | 204—181 |
| 2,980,594 | 4/1961 | Pankove | 204—143 |
| 3,023,153 | 2/1962 | Kurshan | 204—143 |
| 3,280,019 | 10/1966 | Harding et al. | 204—181 |
| 3,282,805 | 11/1966 | Brown | 204—195 |

HOWARD S. WILLIAMS, *Primary Examiner.*

JOHN H. MACK, *Examiner.*

T. TUNG, *Assistant Examiner.*